United States Patent
Perlow

(10) Patent No.: US 6,430,234 B1
(45) Date of Patent: Aug. 6, 2002

(54) METHOD AND APPARATUS FOR PERFORMING PHASE DETECTION AND TIMING RECOVERY FOR A VESTIGIAL SIDEBAND RECEIVER

(75) Inventor: Randall Bret Perlow, Washington Crossing, PA (US)

(73) Assignees: Sarnoff Corporation, Princeton, NJ (US); Motorola Inc., Schaumburg, IL (US)

(*) Notice: Subject to any disclaimer, the term of this patent is extended or adjusted under 35 U.S.C. 154(b) by 0 days.

(21) Appl. No.: 09/124,941

(22) Filed: Jul. 30, 1998

Related U.S. Application Data

(60) Provisional application No. 60/085,864, filed on May 18, 1998.

(51) Int. Cl.[7] ............................................. H04N 5/455
(52) U.S. Cl. ................................... 375/321; 348/726
(58) Field of Search ................................ 375/316, 321, 375/320, 324, 326, 327, 340, 344, 354; 348/726, 725; H04N 5/455, 5/44

(56) References Cited

U.S. PATENT DOCUMENTS

| | | | |
|---|---|---|---|
| 5,588,025 A | * 12/1996 | Strolle et al. | ............... 375/316 |
| 5,706,057 A |   1/1998 | Strolle et al. | ............... 348/426 |
| 5,799,037 A |   8/1998 | Strolle et al. | ............... 375/233 |
| 5,805,242 A |   9/1998 | Strolle et al. | ............... 348/726 |
| 5,872,815 A |   2/1999 | Strolle et al. | ............... 375/321 |
| 5,894,334 A |   4/1999 | Strolle et al. | ............... 348/725 |
| 6,198,780 B1 | * 3/2001 | Kang | ........................ 375/321 |

FOREIGN PATENT DOCUMENTS

| | | |
|---|---|---|
| EP | 0 765 057 A2 | 3/1997 |
| WO | 95/26074 | 9/1995 |
| WO | 98/14005 | 4/1998 |

* cited by examiner

Primary Examiner—David E. Harvey
(74) Attorney, Agent, or Firm—William J. Burke

(57) ABSTRACT

A method and apparatus for performing phase detection and timing recovery for a vestigial sideband (VSB) signal by processing a complex valued passband VSB signal using a high order non-linearity to detect the phase of the VSB signal. As such, an all digital solution to timing recovery for a high definition television is provided.

8 Claims, 2 Drawing Sheets

METHOD AND APPARATUS FOR PERFORMING PHASE DETECTION AND TIMING RECOVERY FOR A VESTIGIAL SIDEBAND RECEIVER

This patent application claims benefit of U.S. provisional patent application Ser. No. 60/085,864, filed May 18, 1998 the disclosure of which is incorporated herein by reference.

The invention relates to vestigial sideband (VSB) signal receivers and, more particularly, the invention relates to timing recovery circuits for such VSB receivers.

BACKGROUND OF THE DISCLOSURE

A conventional vestigial sideband (VSB) signal receiver for a high definition television (HDTV), as described in the "Guide To The Use Of The ATSC Digital Television Standard" Document A/54, Advanced Television Systems Committee, pp. 110–111, Apr. 12, 1995 which is incorporated herein in its entirety by reference, contains an analog circuit to perform carrier recovery. The conventional carrier recovery process uses a frequency locked loop (FLL) and a phase lock loop (PLL) that cooperatively operate to lock onto a pilot carrier of the VSB signal. The recovered carrier signal is then used to produce the in-phase and quadrature components of the VSB signal. Once the VSB signal components are recovered, the in-phase (I) component is digitized and then digitally processed to recover symbol timing and decode the data transmitted within the VSB signal.

Symbol timing recovery is performed using the digitized I component only. To accomplish accurate timing recovery using only the I component, the timing recovery circuitry of the VSB signal receiver must detect a four symbol segment synchronization header within the data of the VSB signal. The synchronization header is used to synchronize the receiver symbol timing with the received signal such that the symbols can be accurately decoded to recover the data transmitted within the VSB signal. Consequently, current VSB receivers must have analog circuitry to perform certain functions prior to digitization of the signal and must utilize synchronization header information to achieve accurate symbol timing. The use of analog circuitry is prone to add noise to the received signal and the processing required for decoding the synchronization header is an inefficient use of the receiver.

Therefore, there is a need in the art for a digital passband carrier and timing recovery circuit that performs carrier recovery and symbol timing recovery upon a VSB signal to recover the in-phase and quadrature-phase components of the VSB signal.

SUMMARY OF THE INVENTION

The disadvantages associated with the prior art are overcome by the invention of a method and apparatus for performing phase detection and timing recovery for a vestigial sideband (VSB) signal by processing a complex valued passband VSB signal using a high order non-linearity to detect the phase of the VSB signal. The non-linearity is produced by extracting the complex bandedge signals from a VSB signal and multiplying the complex conjugate of the lower bandedge signal with the upper bandedge signal using a complex multiplier. The real and imaginary components of the output of the complex multiplier are then multiplied with one another using a real multiplier. The result is a phase error signal that is used as a control signal for a numerically controlled oscillator. The non-linearity can be mathematically defined as:

$$v(t) = g_+(t) \times g_-^*(t)$$

$$y(t) = sgn(Re\{v(t)\}) \times Im\{v(t)\}$$

where y(t) is the is the output (phase error signal) of the phase detector, $g_+(t)$ is the complex upper (positive frequency) bandedge signal, $g_-^*(t)$ is the complex conjugate of the lower (negative frequency) bandedge signal. As such, an all digital solution to timing recovery from a VSB signal for a high definition television is provided.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
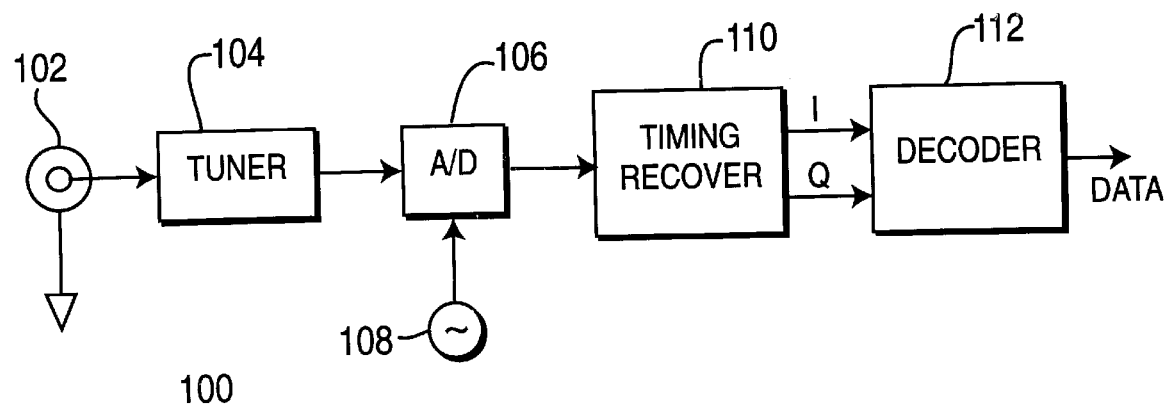
FIG. 1 is a simplified block diagram of a vestigial sideband (VSB) signal receiver incorporating the present invention.

FIG. 1 is a simplified, block diagram of a vestigial sideband (VSB) signal receiver 100 for a high definition television (HDTV) containing a tuner 104, an analog-to-digital (A/D) converter 106, a free-running oscillator 108, a timing recovery circuit 110, and a decoder 112. Input connector 102 is generally connected to a source of the VSB signal such as a cable television network or an antenna. The tuner 104 selects a particular channel from a plurality of channels to couple a particular VSB signal to the analog-to-digital converter 106. The A/D converter 106 digitizes the selected VSB signal. The sample frequency generated by the free-running oscillator 108 is at least two times the symbol rate of the VSB signal. The digitized signal has a nominal frequency of one-fourth the sampling rate ($f_{samp}/4$) and is coupled to the carrier and timing recovery circuit 110 to synchronize the symbol sampling process of the receiver to the received VSB signal. The carrier and timing recovery circuit 110 is an all digital circuit that extracts the in-phase (I) and quadrature phase (Q) signals from the digitized VSB signal. The I and Q signals are coupled to the decoder 112 which extracts data from the I component of the received signal.

Figure 2:
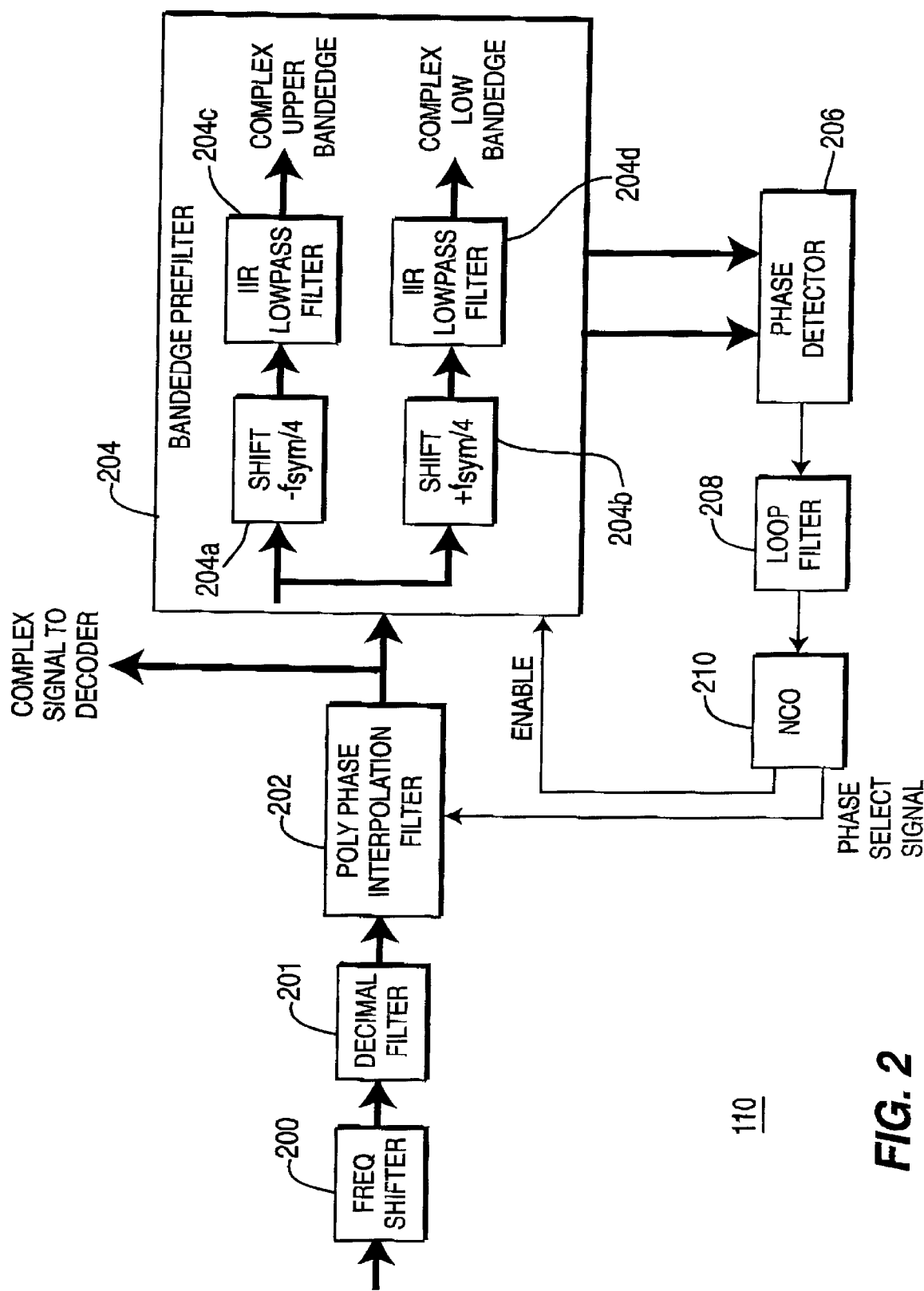
FIG. 2 is a detailed block diagram of a carrier and timing recovery circuit in accordance with the present invention.

FIG. 2 depicts a detailed block diagram of the timing recovery circuit 110 of FIG. 1. The timing recovery circuit 110 contains a frequency shifter 200, a decimation filter 201, a polyphase interpolation filter 202, a bandedge prefilter 204, a phase detector 206, a loop filter 208 and a sampling numerically controlled oscillator (NCO) 210. The bold connective paths of FIG. 2 represent complex signal paths and the non-bold connective paths represent real signal paths.

The timing recovery circuit 110 operates using a single clock. However, the circuit 110 operates at three processing rates, i.e., the sampling rate ($F_{samp}$), (half the sampling rate ($f_{samp}/2$) and the symbol rate ($f_{sym}$). To achieve these three processing rates with a single clock, the various subcircuits are selectively enabled to perform synchronous processing on desired cycles.

The frequency shifter operates by multiplying the digitized VSB signal (a real signal) with samples of a complex sinusoid $$x(n) = e^{\frac{j\pi}{2}n}$$

(having a frequency of one-fourth the sampling rate). To correctly shift the frequency to enable the invention to function, the sampling rate is chosen such that the aliased copies of the VSB signal are located at ¼ the sampling frequency. For example, the IF frequency of the signal generated by the tuner is nominally 43.75 MHz and that signal is subsampled at 25 MHz resulting in signal aliases at ±6.25 MHz. Since the values of x(n) are always in the set {1, j, −1, −j}, the frequency shift operation shifts the digitized signal to DC and is performed with only multiplexers and inverters, thus keeping the circuit rather simple and inexpensive to implement. The output of the frequency shifter 200 is a passband signal that is shifted to DC and contains complex in-phase (I) and quadrature phase (Q) components of the VSB signal having upper and lower bandedges at ±$F_{sym}$/4. The decimation filter 201 removes undesired sidebands and spectral aliases from the frequency shifted signal, and provides a sampling rate reduction for the interpolation filter 202. The decimation filter 201 is an N-tap low pass FIR filter having real valued coefficients. After filtering, every other output sample is discarded such that the output rate is $f_{samp}/2$ (e.g., 12.5 MHz). An illustrative filter is a symmetric, odd-length, windowed-sinc function having all non-zero even filter coefficients and only one non-zero odd coefficient at the center of the filter. With the tap coefficients being symmetric about (N−1)/2, the decimation filter is defined by the following equation:

$$Z_I[nT'] = \sum_{k=0}^{(N+1)/4} h[2kT]\left(y_I[(2n-k)T] + y_I\left[2\left(n+k-\frac{N-1}{2}\right)T\right]\right)$$

$$Z_Q[nT'] = h\left[\frac{(N-1)}{2}T\right]y_Q\left[\left(2n-\frac{N-1}{2}\right)T\right]$$

where
T'=2T and T is the symbol period as well as the tap spacing;
n is the sample index of the filter output;
k is a sample index used for the convolutional sum; and
h( ) are the samples of a sinc function.

This filter is efficiently implemented using only ((N+1)/4)+1 multiplication functions. If the filter is clocked at twice the sampling frequency, then the actual number of hardware multipliers can be reduced by a factor of four by using resource sharing. For example, a 23-tap, complex decimation filter (having 13 non-zero, real valued coefficients) requires 7 multiply operations and, with resource sharing, can therefore be implemented using only 2 hardware multipliers.

The polyphase interpolation filter 202 removes any undesired spectrum from the decimated VSB signal (i.e., high frequency components are suppressed) and adds a timing delay specified by the output (a phase selection signal) of the numerically controlled oscillator (NCO) 210. The polyphase filter is implemented using a conventional polyphase FIR lowpass filter having a pulse shape with zero amplitude at multiples of the symbol period. By proper variation of the phase selection signal, the NCO can drive the polyphase interpolation filter to perform sampling rate conversion.

Specifically, the NCO 210 accumulates values of phase error presented at its input and uses the accumulated value to drive the phase selection port of the polyphase filter 202. The input to the NCO 210 controls the rate of accumulation and, therefore, the rate at which the phase select signal changes. When producing a phase select signal having the form of a linear ramp, the polyphase interpolation filter performs a sampling rate conversion. The input rate to the interpolation filter is $F_{samp}/2$ (12.5 MHz) which is faster than the symbol rate $f_{sym}$ (10.76 MHz). The filter is implemented to have 256 selectable phases using a Hamming-windowed sinc function. The interpolation filter generates output data at a rate of $f_{samp}/4$, with a desired output data rate of $f_{sym}$. To obtain this rate, the sampling NCO controls the phase selection of the interpolation filter and generates an enable signal for the bandedge prefilter 204 to control data flow from the interpolation filter 202. The phase select signal and the enable signal change at an average rate of $f_{sym}$, thus performing the desired rate conversion. After convergence of the carrier and timing recovery loop, the input to the NCO 210 will (roughly) become a constant value and the output rate of the interpolation filter 202 is the symbol rate $f_{sym}$. The output signal of the polyphase interpolation filter 202 is a resampled passband VSB signal, containing complex I and Q components.

The bandedge prefilter 204 extracts bandedge information from the resampled VSB signal by performing a positive and a negative frequency shift (using frequency shifters 204A and 204B) on the output of the interpolation filter 202 and then lowpass filters (filters 204C and 204D) the frequency shifted results. The frequency shift is performed in blocks 204A and 204B by multiplying the complex input signal with a complex sinusoid $$x(n) = e^{\frac{\pm j\pi}{2}n}.$$

One frequency shifter 204A and 204B is required for each bandedge. As such, shifter 204A shifts the complex input signal by −$f_{sym}$/4 and shifter 204B shifts the complex input signal by +$f_{sym}$/4. Since the values of x(n) are always in the set {i, j, −1, −j}, the frequency shifting operation can be performed with only multiplexers and inverters, thus keeping the circuit rather simple and inexpensive to implement.

The lowpass filter portions of the prefilter 204 can be implemented using a pair of single pole lowpass IIR filters 204C and 204D. If the pole of each filter 204C and 204D is constrained to lie at $z=(2^N−1)/2^N$, where N is an integer value greater than 0, the lowpass filter can be implemented using simple shifters and adders.

Generally, a second-order nonlinearity that is typically used for QAM signal timing recovery is insufficient for VSB signals. Consequently, the carrier and timing recovery circuit of the present invention uses a unique, higher order nonlinearity mathematically defined by:

$$v(t)=g_+(t)\times g_-^*(t)$$

$$y(t)=sgn(Re\{v(t)\})\times Im\{v(t)\}$$

where y(t) is the is the output of the phase detector, $g_+(t)$ is the complex valued prefilter output for the upper (positive frequency) bandedge, $g^*_-(t)$ is the complex conjugate of the prefilter output for the lower (negative frequency) bandedge. The output v(t) has been proposed for phase detection in QAM systems in Godard, "Passband Timing Recovery in an All-Digital Modem Receiver", IEEE Transactions on Communications, com-26, No. 5, May 1978. The additional processing to generate y(t) by multiplying the real and imaginary components of v(t) permits phase detection for VSB systems, i.e., the magnitude of the signal y(t) is proportional to the phase error of the received VSB signal with respect to the receiver clock.

Figure 3:
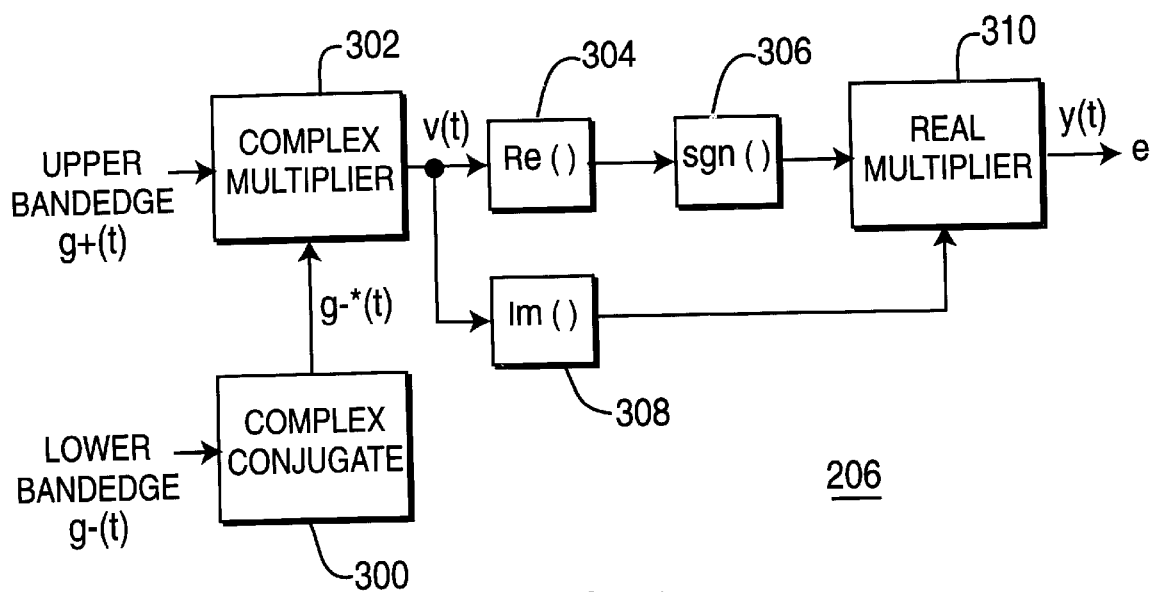
FIG. 3 is a detailed diagram of the phase detector of the present invention.

FIG. 3 depicts a block diagram representation of the foregoing equation pair, where the lower bandedge signal g(t) is processed in complex conjugate block 300. The complex conjugate of the lower bandedge signal $g^*_-(t)$ is then applied to a first input of a complex multiplier 302. The second input of the multiplier is the upper bandedge signal $g_+(t)$ such that the output of the complex multiplier 302 is v(t). The signal v(t) is the applied to a imaginary component extractor 308 that applies only the imaginary component of the signal v(t) to a first input of a real multiplier 310. The signal v(t) is also applied to a real component extractor 304 that extracts the real component of the signal v(t) and applies it to a signum (sgn) function block 306. The output of the signum function block 306 is applied to the second input of the real multiplier 310. The output of the multiplier 310 is the signal y(t), also referred to as the phase error signal.

Returning to FIG. 2, the output of the phase detector 206 is a real valued signal that is coupled to the loop filter 208. The loop filter 208 is a conventional, second order digital lowpass filter that facilitates frequency and phase tracking by the timing recovery loop. The output of the loop filter is coupled to the control port of the NCO 210.

Figure 4:
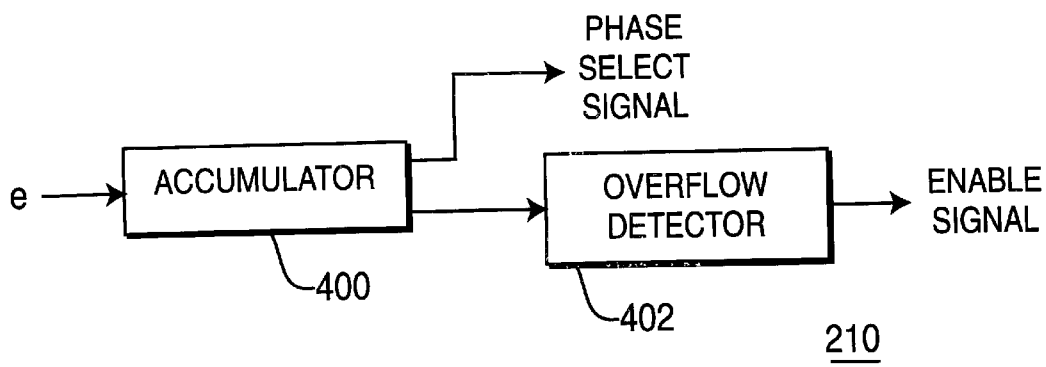
FIG. 4 is a block diagram of an NCO used in the carrier and timing recovery circuit of FIG. 2.

FIG. 4 depicts a simplified block diagram of the NCO 210. The NCO 210 contains an accumulator 400 and an overflow detector 402. For a constant control signal from the loop filter, the output phase select signal of the NCO 210 is a periodic signal at the $T_{sym}$ rate, i.e., the appropriate resampling rate for the interpolation filter when the phase error is zero. The difference (an incremental time delay d) within the interpolation filter between the input sample locations that occur at a rate of $T_{samp}/2$ and the output sample locations that occur at a rate of $T_{sym}$ accumulates within the accumulator 400. To optimize the interpolation, it is desirable to maintain the output sample time (location) close to the input sample time (location). When the phase of the received VSB signal is changing with respect to the receiver clock, the time delay d will vary, i.e., will slew with phase error. Consequently, the difference between when an input sample occurs in time and when an output sample occurs in time will increase with the passing of each symbol period until the delay exceeds an entire period. The accumulator 400 adds the previous time delay to the next time delay, and the next time delay, and so on. This increasing accumulation forms the phase select signal, i.e., a linear ramp. When the delay detector 402 detects that the delay has accumulated to a value that exceeds the sampling period $T_{samp}/2$, the bandedge filter 204 is disabled for one sampling period to halt the phase detection process for one symbol period. This brings the sampling locations within the $T_{samp}/2$ and the $T_{sym}$ periods near one another within a symbol period and restarts the time delay accumulation.

The carrier and timing recovery circuit of the present invention provides an all digital technique for performing timing recovery in a VSB signal receiver of an HDTV. By using the invention in lieu of the analog timing recovery circuits of the prior art, the circuitry of a receiver using the invention will be less prone to adding noise to the received signals and less expensive to implement.

Although the foregoing embodiments of the invention are described in the context of a hardware implementation, those skilled in the art will realize that the invention can be implemented, in whole, or in part, as a software routine executing upon a general purpose computer. Such a software routine would be stored until executed upon a computer readable medium. The invention can also be implemented, in whole, or in part, as an application specific integrated circuit (ASIC). The description of particular techniques for implementing the invention should not be considered limiting the scope of the invention in any manner.

Although various embodiments which incorporate the teachings of the present invention have been shown and described in detail herein, those skilled in the art can readily devise many other varied embodiments that still incorporate these teachings.

What is claimed is:

1. A timing recovery apparatus comprising:
   a frequency shifter;
   a polyphase interpolation filter connected to the frequency shifter;
   a bandedge prefilter connected to the polyphase interpolation filter;
   a phase detector, connected to the bandedge filter, having a fourth order nonlinearity;
   a loop filter connected to the phase detector; and
   a numerically controlled oscillator connected to the loop filter and connected to the polyphase interpolation filter.

2. The apparatus of claim 1 wherein the output of the phase detector is real valued.

3. The timing recovery apparatus of claim 1 wherein the fourth order nonlinearity is defined by $$v(t)=g_+(t) \times g_-^*(t)$$
$$y(t)=sgn(Re\{v(t)\}) \times Im\{v(t)\}$$

where y(t) is an output of the phase detector, g(t) is a complex valued prefilter output for an upper bandedge, g(t) is a prefilter output for a lower bandedge.

4. The timing recovery apparatus of claim 1 wherein the bandedge prefilter produces a lower complex bandedge signal and an upper complex bandedge signal and said phase detector comprises:
   a complex conjugate block for producing a complex conjugate of the lower complex bandedge signal;
   a complex multiplier for multiplying the complex conjugate of the lower complex bandedge signal with the upper complex bandedge signal producing a multiplied signal;
   an imaginary extractor for extracting the imaginary component of the multiplied signal;
   a real extractor for extracting a real component of the multiplied signal;
   a signum function block for applying a signum function to the real component of the multiplied signal; and
   a real multiplier for multiplying an output of signum function block with the imaginary component of the multiplied signal to produce a phase error signal.

5. A high definition television comprising:
   a tuner for selecting a vestigial sideband (VSB) signal from a plurality of VSB signals;
   an analog-to-digital (A/D) converter for digitizing the selected VSB signal;
   a timing recovery circuit for processing the digitized VSB signal to extract in-phase and quadrature phase components of the VSB signal, where said timing recovery circuit uses a high order nonlinearity to detect the phase of the VSB signal and further comprises:

a frequency shifter;

a polyphase interpolation filter connected to the frequency shifter;

a bandedge prefilter connected to the polyphase interpolation filter;

a phase detector, connected to the bandedge filter having a fourth order nonlinearity;.

a loop filter connected to the phase detector; and a numerically controlled oscillator connected to the loop filter; and a decoder for extracting data from the in-phase component of the VSB signal.

6. The high definition television of claim 5 wherein the output of the phase detector is real valued.

7. The high definition television of claim 5 wherein the phase detector uses a high order nonlinearity defined by $$v(t)=g_+(t) \times g_-^*(t)$$

$$y(t)=sgn(Re\{v(t)\}) \times Im\{v(t)\}$$

where y(t) is an output of the phase detector, g(t) is a complex valued prefilter output for an upper bandedge, g(t) is a prefilter output for a lower bandedge.

8. The high definition television of claim 7 wherein the bandedge prefilter produces a lower complex bandedge signal and an upper complex bandedge signal and said phase detector comprises:

a complex conjugate block for producing a complex conjugate of the lower complex bandedge signal;

a complex multiplier for multiplying the complex conjugate of the lower complex bandedge signal with the upper complex bandedge signal producing a multiplied signal;

an imaginary extractor for extracting the imaginary component of the multiplied signal;

a real extractor for extracting a real component of the multiplied signal;

a signum function block for applying a signum function to the real component of the multiplied signal; and a real multiplier for multiplying an output of signum function block with the imaginary component of the multiplied signal to produce a phase error signal.

* * * * *